(12) United States Patent
Popovic et al.

(10) Patent No.: US 8,311,009 B2
(45) Date of Patent: Nov. 13, 2012

(54) METHOD, TRANSCEIVER AND TELECOMMUNICATION SYSTEM FOR GENERATING REFERENCE SEQUENCE MATRICES AND FOR MAPPING ELEMENTS THEREOF

(75) Inventors: Branislav Popovic, Stockhom (SE); Fredrik Berggren, Väsby (SE); Jaap van de Beek, Täby (SE)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 595 days.

(21) Appl. No.: 12/497,278

(22) Filed: Jul. 2, 2009

(65) Prior Publication Data

US 2009/0303961 A1    Dec. 10, 2009

Related U.S. Application Data

(63) Continuation of application No. PCT/CN2007/000017, filed on Jan. 5, 2007.

(51) Int. Cl.
*H04W 4/00* (2009.01)

(52) U.S. Cl. ......... 370/330; 370/329; 370/335; 370/336

(58) Field of Classification Search .................. 370/206, 370/267, 311, 329, 330; 375/260, 267, 295, 375/150, 347
See application file for complete search history.

(56) References Cited

U.S. PATENT DOCUMENTS

| | | | |
|---|---|---|---|
| 8,098,750 B2 * | 1/2012 | Mueck et al. ................. | 375/267 |
| 2002/0181607 A1 * | 12/2002 | Izumi ........................... | 375/295 |
| 2004/0048585 A1 * | 3/2004 | Snyder et al. ................. | 455/115.1 |
| 2005/0113142 A1 * | 5/2005 | Felter .......................... | 455/562.1 |
| 2005/0147025 A1 * | 7/2005 | Auer ............................ | 370/203 |
| 2005/0163243 A1 * | 7/2005 | Chung et al. .................. | 375/267 |

FOREIGN PATENT DOCUMENTS

| | | |
|---|---|---|
| CN | 1841966 A | 10/2006 |
| CN | 1878158 A | 12/2006 |
| WO | WO 2006/023423 A2 | 3/2006 |

OTHER PUBLICATIONS

Mamoru Sawahashi et al., Broadband Packe Wireless Access, Sep. 2004, NTT Technical Review, vol. 2, 1-31.*

(Continued)

*Primary Examiner* — Hassan Phillips
*Assistant Examiner* — Anez Ebrahim
(74) *Attorney, Agent, or Firm* — Finnegan, Henderson, Farabow, Garrett & Dunner, LLP

(57) ABSTRACT

An method for, in a cellular telecommunication system, generating reference sequence matrices and for mapping elements of said reference sequence matrices to reference signal positions having predetermined locations in two-dimensional multi-carrier time-frequency symbol spaces is provided. According to the method, a matrix $S_N$ of dimension N×N having N orthogonal rows or columns and orthogonal parts of rows or columns, respectively, N being a positive integer >3, is generated. N reference sequence matrices $OS^{(k)}$, $k=0, \ldots, N-1$, are then generated by forming rows or columns of the kth reference sequence matrix $OS^{(k)}$ based on at least part of the $(k+1)$th row or column, respectively, of said orthogonal matrix $S_N$. Further, in a cell, within a given time period, mapping elements of one of said N reference sequence matrices $OS^{(k)}$ to reference signal positions having predetermined locations in two-dimensional multi-carrier time-frequency symbol spaces.

24 Claims, 3 Drawing Sheets

OTHER PUBLICATIONS

International Search Report from P.R. China in International Application No. PCT/CN2007/000017 mailed Sep. 13, 2007.

Kishiyama, et al., "Intra-Node B Orthogonal Pilot Channel Structure for OFDM Radio Access in Evolved UTRA Downlink", IP Radio Network Development, IEEE, pp. 201-205, (2006).

Nokia, et al, TSG-RAM WG1 #46bis, R1-062990, Seoul, Korea, pp. 1-2, (Oct. 9-13, 2006).

Ericsson, "Downlink reference-signals Discussion", TSG RAN1 #46bis, R1-063008, pp. 1-4, (2006).

NTT Docomo, et al., "Reference Signal Structure in E-UTRA Downlink", 3GPP TSG RAN WG1 Meeting #46bis, R1-062724, pp. 1-5, (Oct. 9-13, 2006).

Motorola, "Simulation Results for GCL based DL Reference Signals", 3GPP TSG RAN WG1 Meeting #47, R1-063055, pp. 1-6, (Nov. 6-10, 2006).

Written Opinion of the International Searching Authority (translation) dated (mailed) Sep. 13, 2007, issued in related Application No. PCT/CN2007/000017, filed Jan. 5, 2007, Huawei Technologies Co., Ltd.

* cited by examiner

METHOD, TRANSCEIVER AND TELECOMMUNICATION SYSTEM FOR GENERATING REFERENCE SEQUENCE MATRICES AND FOR MAPPING ELEMENTS THEREOF

CROSS-REFERENCE TO RELATED APPLICATION

This application is a continuation of International Patent Application No. PCT/CN2007/000017, filed on Jan. 5, 2007, and entitled "Two-dimensional Reference Signal Sequences," the entire content of which is incorporated herein by reference in its entirety.

FIELD OF THE DISCLOSURE

The present disclosure relates to the field of telecommunication, and more particularly, to a method, a transceiver and a telecommunication system for generating reference sequence matrices and for mapping elements of said reference sequence matrices to reference signal positions having predetermined locations in two-dimensional multi-carrier time-frequency symbol spaces.

BACKGROUND OF THE DISCLOSURE

In mobile communication systems, such as systems utilizing Orthogonal Frequency Division Multiplexing (OFDM), Frequency Division Multiple Access (FDMA), Multi-Carrier Code Division Multiple Access (MC-CDMA) techniques or the like, reference signals are commonly used for channel estimation. The basic idea for this is that a reference signal known by both a transmitter and a receiver is transmitted from the transmitter to the receiver and then the receiver may compare the received reference signal with the known reference signal, and from this comparison determine the channel characteristics.

Hereafter the background of the disclosure and also the disclosed embodiments itself will, for illustrational purposes, be exemplified in terms of a $3^{rd}$ Generation Partnership Project Long Term Evolution (3GPP LTE) cellular system using OFDM. Embodiments as disclosed herein may also applicable to other communication systems and transmission methods. The disclosed embodiments may be applicable to essentially any multi-carrier system. Terms like User Equipment (UE) or Node B in the following text should therefore be interpreted broadly to also include base stations, or any other node in a cell communicating with UEs or the like, and mobile stations, or any other type of mobile unit communicating with a Node B or the like.

In an OFDM system, two-dimensional reference signals are used for channel estimation, the two dimensions relating to time and frequency. A two-dimensional time-frequency space is determined, which defines the positions of the reference symbols. This two-dimensional time-frequency space is in 3GPP LTE given by Ericsson, "Downlink reference-signals", 3GPP RAN1 Tdoc R1-063008, Seoul, Korea, October, 2006. ("Ericsson") as:
Reference-Symbol Position (Sub-Carrier) within Sub-Frame #n
First reference symbols: Sub-carrier x(n)+k*6 (in OFDM symbol #0).
Second reference symbols: x(n)+k*6+3 (in OFDM symbol #4 or #5).
Alternatives
  1. x(n) constant and cell common→No hopping/shift.
  2. x(n) constant but cell specific→Cell-specific frequency shift.
  3. x(n) time varying and cell specific→Cell-specific frequency hopping.

The reference symbols are modulated by two-dimensional reference symbol sequences, which we shall denote as Reference Symbol Sequence (RSS). In order to improve inter-cell interference randomization, different RSSs are used in different cells. To be able to utilize the reference symbols for channel estimation, the RSS first has to be identified by a UE in the system. This is done during a so called cell search procedure, which includes detection of a cell ID. The cell search typically consists of three steps: the first step performs synchronization using the synchronization channel, the second step detects a group ID and frame synchronization from the synchronization channel, and the third step detects the complete cell ID from the reference signal. According to Ericsson, there is a one-to-one relation between the two-dimensional reference-symbol sequence, RSS, and the cell ID.

In 3GPP LTE, the RSS is constructed as a product of a pseudo-random sequence (PRS) and an orthogonal sequence (OS). Some embodiments disclosed herein may focus on the construction of orthogonal sequences, but it may here be mentioned that a PRS design could in turn be constructed as a product of different sequences, as described in Motorola, "Simulation results for GCL based DL reference signals", 3GPP RAN1 Tdoc R1-063055, Riga, Latvia, November, 2006 ("Motorola"). Typically, the same PRS would be used for all cells connected to and under control of the same Node B, whereas different OS may be used in the different cells controlled by that Node B. It is reasonable to assume that the PRS and the sequence x(n) should be determined from a so called group ID, obtained in a $2^{nd}$ step of the cell search, as described in Nokia et al., "Outcome of cell search drafting session", 3GPP RAN1 Tdoc R1-062990, Seoul, Korea, October, 2006 ("Nokia"), so that it can be used to re-modulate the reference signals (i.e., be cancelled). Thus, in that case the number of group IDs must be equal to the number of PRSs. The correct phase of a PRS is also known after the $2^{nd}$ step, from the acquired frame synchronization. Thereby, after the $2^{nd}$ step, the PRS is known and can be cancelled from the reference signal. Then the detected sequences in the $3^{rd}$ step are orthogonal since only the OS remains in the reference symbols. The OS used can then be detected by correlating the values of received reference symbols with all possible OSs, in a $3^{rd}$ step of the cell search.

However, there are a number of problems related to conventional reference sequences, and in particular to the orthogonal sequences (OSs). The conventional cell search procedure is limited by fixed rules regarding the characteristics of the OSs and the PRSs. These fixed rules make the design of the cell search procedure very inflexible, which may result in an inefficient cell search. There is thus a need for a cell search having a more optimized performance than the one shown in the related art.

There is further a radio transmission overhead problem in conventional solutions. It is, as always in radio communication systems, desirable to utilize the radio resources in the system as efficiently as possible and to mitigate the signaling overhead in the system.

Further, if a Node B controls many cells, OSs may have to be reused in conventional systems. This may result in problems related to OS reuse, such as OS reuse planning and high levels of pilot-to-pilot interference between neighboring cells or sectors having reused OSs.

SUMMARY OF THE DISCLOSURE

A method in a cellular telecommunication system for generating reference sequence matrices and for mapping elements of said reference sequence matrices to reference signal positions having predetermined locations in two-dimensional multi-carrier time-frequency symbol spaces is provided. The method includes generating a matrix $S_N$ of dimension N×N having N orthogonal rows or columns and orthogonal parts of rows or columns, respectively, N being a positive integer >3, generating N reference sequence matrices $OS^{(k)}$, k=0, . . . , N−1, by forming rows or columns of the kth reference sequence matrix $OS^{(k)}$ based on at least part of the (k+1)th row or column, respectively, of said orthogonal matrix $S_N$, and mapping elements of one of said N reference sequence matrices $OS^{(k)}$ to reference signal positions having predetermined locations in two-dimensional multi-carrier time-frequency symbol spaces.

A transceiver for use in a cellular telecommunication system is also provided. The transceiver is configured to generate reference sequence matrices and to map elements of said reference sequence matrices to reference signal positions having predetermined locations in two-dimensional multi-carrier time-frequency symbol spaces, which includes means for generating a matrix $S_N$ of dimension N×N having N orthogonal rows or columns and orthogonal parts of rows or columns, respectively, N being a positive integer >3, means for generating N reference sequence matrices $OS^{(k)}$, k=0, . . . , N−1, by forming rows or columns of the kth reference sequence matrix $OS^{(k)}$ based on at least part of the (k+1)th row or column, respectively, of said orthogonal matrix $S_N$, and means for mapping elements of one of said N reference sequence matrices $OS^{(k)}$ to reference signal positions having predetermined locations in two-dimensional multi-carrier time-frequency symbol spaces.

Detailed exemplary embodiments and advantages of the method, the transceiver and the telecommunication system according to the disclosure will now be described with reference to the appended drawings illustrating some exemplary embodiments.

DETAILED DESCRIPTION OF THE EMBODIMENTS

Figure 1:
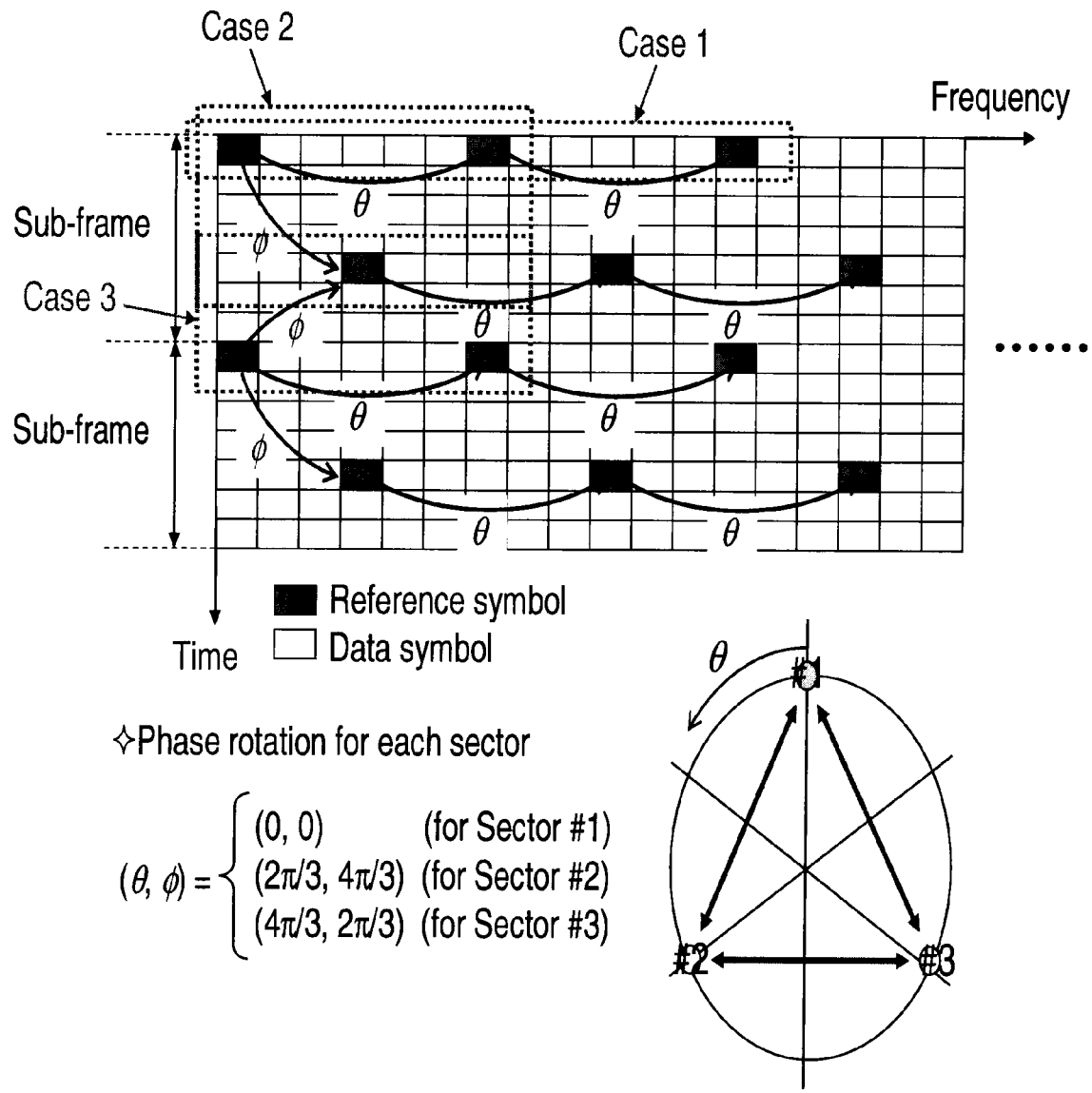
FIG. 1 shows an example of a design of the OSs in the LTE system in the prior art.

In the cell search, if the number of group IDs could be relatively small, a high detection rate is achieved in the $2^{nd}$ step, since few candidate sequences have to be evaluated. However, a reduction of the number of group IDs (i.e., PRSs) needs to be compensated by using more OSs, since the number of PRSs times the number of OSs should equal the number of cell IDs, which is a fixed number. On the other hand, increasing the number of OS may reduce the detection rate of the $3^{rd}$ step in cell search, because more candidate sequences have to be evaluated and more OSs imply longer OSs, since the length of OSs must be equal to the number of OSs. Longer OSs make the correlation detection more susceptible to channel variations over the reference symbols. Thus, in terms of cell search performance, there is a trade-off between the number of PRSs and the number of OSs. In Ericsson, it was suggested, with little motivation, to fix the number of sequences to 170 PRSs and 3 OSs, resulting in 510 (170*3=510) cell IDs. These numbers are a direct consequence from the OS design of NTT DoCoMo et al., "Reference signal structure in E-UTRA downlink", 3GPP RAN1 Tdoc R1-062724, Seoul, Korea, October, 2006 ("NTT DoCoMo"), which is limited to 3 sequences. Thus, it would be desirable to have a more flexible design of RSSs, having more options regarding the number of PRSs and OSs than one fixed number for PRS and one fixed number for OS described in related art. A RSS design, which allows for a choice of other numbers than 170 PRSs and 3 OSs, is needed. Such a flexible design would allow for optimizing the numbers of PRSs and OSs. This requires construction of more than three OSs. For instance, if there were six available OSs, 510 cell IDs may also be obtained by the use of 85 PRSs and 6 OSs (85*6=510). The use of 85 PRSs and 6 OSs, which may be possible through the improved number of options in RSS design, may result in a better cell search performance.

Alternatively, instead of keeping the number of cell IDs fixed to 510 and optimizing the number of OSs for minimum cell search times, an increased number of OSs makes it possible to encode additional cell-specific information to be detected in the cell search, e.g., the antenna configuration of the cell. In 3GPP LTE, there are 12 subcarriers dedicated to the OS in one symbol within the synchronization channel. The inventors of the present invention have realized that this allows for use of up to 12 OSs. They have further come to the conclusion that, by keeping 170 PRSs and using 12 OSs, thereby resulting in number of 2040 (=170*3*4) cell IDs, this could be used for encoding further information, such as cell specific information. This cell specific information may, for example, specify which one of four possible antenna configurations that is used in the cell. Thus, if more than three OSs are generated they may be used for carrying such information.

Therefore, some embodiments may generate an arbitrary number larger than three of OSs to be used for making the design of the cell search procedure more flexible and for making it possible to enable the choice of an OS to be used to carry information in the system. Some embodiments as disclosed herein may present an efficient method for generating such OSs.

According to some embodiments, a design solution for generation of OSs of the two-dimensional reference symbol sequences that allow flexible grouping of the cell IDs, suitable for optimizing the performance of the cell search in a cellular system is provided. The generation of OSs according to the embodiments also allows lowering of overhead in the system, since cell specific information that would normally add to the overhead in the system according to the embodiments may be encoded using the generated OSs.

The generation of more than three OSs may also result in more cell IDs than in the related art. This increased number of cell IDs may be used for avoiding OS reuse in the cells. However, this requires a larger set of OSs than that was used in the related art. In the prior art, the number of OSs was three, whereas the number of OSs according to some embodiments is higher than three. The generation of OSs according to some embodiments also allows orthogonal correlation detection. At the same time, the proposed sequence construction allows for orthogonal despreading of the OFDM reference signals belonging to the different cells of a single Node B, which is a property used in the channel estimation.

Two-dimensional orthogonal reference signals should be designed fulfilling two conditions:
1. The number of OSs should be maximized for a given two-dimensional definition grid.
2. Over a subgrid of the whole two-dimensional definition grid, some of the OSs should be orthogonal.

The first condition gives a large set of OSs, which increases the possibilities of selecting a suitable number of OS for optimizing the cell search procedure and/or encoding cell-specific information.

The second condition assures orthogonal despreading on smaller grids, which reduces the interference between RSSs in the channel estimation.

FIG. 1 shows an example of a design of the OSs in the LTE system as proposed in NTT DoCoMo. The sequences are here constructed by phase rotations as disclosed in Y. Kishiyama, K. Higuchi, and M. Sawahashi, "Intra-Node B orthogonal pilot channel structure for OFDM radio access in Evolved UTRA downlink", in Proc. IEEE VTC-Spring, vol. 1, pp. 201-205, 2006 ("Kishiyama"). Note that FIG. 1 and the reference documents use the terminology cell and sector for sectors for dividing cells into smaller regions, whereas in this description the terminology cell and cells under control of one Node B, respectively is used.

From studying FIG. 1, it can be understood that the minimum building block of the two-dimensional OS for a cell in a subframe can be described by a 2×3 matrix where the rows denote the time-dimension and the columns the frequency-dimension. This may be seen in FIG. 1 since the phase shifts in FIG. 1 generates sequences having a period of three elements/OFDM symbol. If more than three pilot positions/OFDM symbols are used, the sequences will be repeated. It is therefore sufficient to extract three elements/OFDM symbols to describe the OS.

Using the given phase rotations in FIG. 1, the matrices of three cells under control of a Node B can be written as $OS^{(k)}$, k=0, 1, 2, where cell k+1 uses $OS^{(k)}$, $$OS^{(0)} = \begin{pmatrix} 1 & 1 & 1 \\ 1 & 1 & 1 \end{pmatrix},$$

$$OS^{(1)} = \begin{pmatrix} 1 & e^{j2\pi/3} & e^{j4\pi/3} \\ e^{j4\pi/3} & 1 & e^{j2\pi/3} \end{pmatrix},$$

$$OS^{(2)} = \begin{pmatrix} 1 & e^{j4\pi/3} & e^{j2\pi/3} \\ e^{j2\pi/3} & 1 & e^{j4\pi/3} \end{pmatrix}$$

Due to the sequence construction by phase rotation, periodicity is obtained so that the orthogonal sequence in a subframe of FIG. 1 may be described by a repetition in the frequency domain of the $OS^{(k)}$ matrix.

Assuming that there are 12 subcarriers for reference symbols, the OS matrix is repeated 4 times, ($OS^{(k)}$, $OS^{(k)}$, $OS^{(k)}$, $OS^{(k)}$). Thus although 12 reference symbols are used per OFDM symbol, there are still only 3 orthogonal sequences. Thereby one of the desired properties for OSs given above, conditioning that the number of OSs should be maximized for a given two-dimensional definition grid, is not fulfilled, as there could be up to 12 orthogonal sequences in an OFDM symbol.

Figure 2:
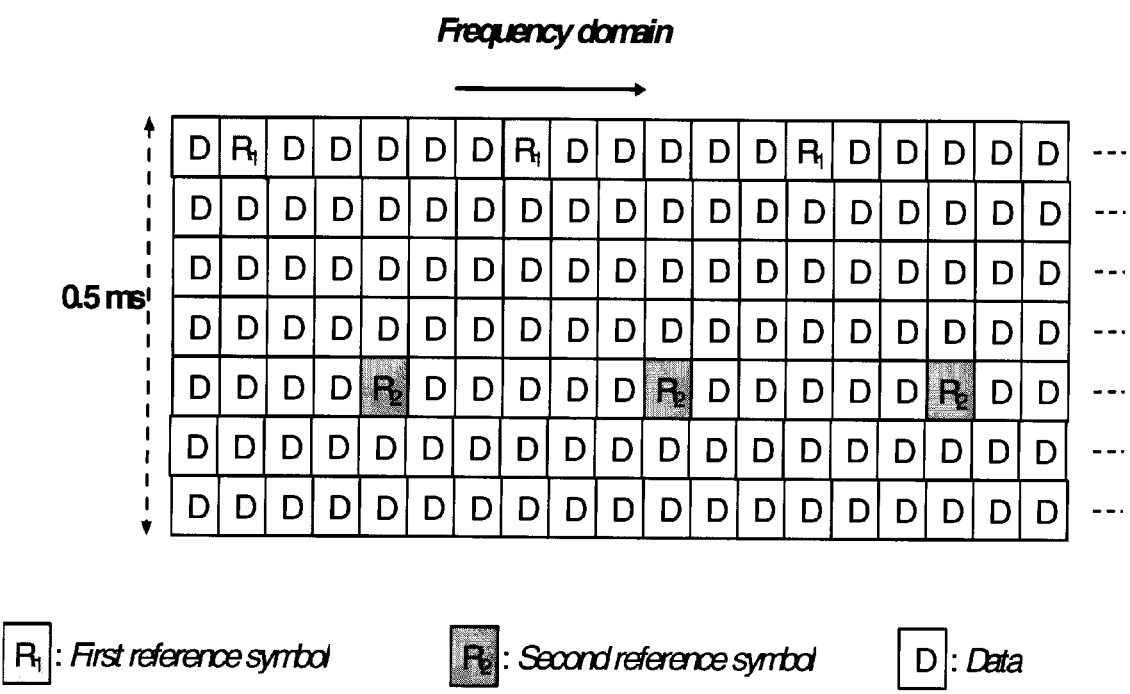
FIG. 2 shows an example of an OFDM symbol grid with reference signal positions in time and frequency in the prior art.

In FIG. 2, an example of an OFDM symbol grid with reference signal positions in time and frequency is shown. In LTE, the OSs is first generated and then multiplied element-by-element with a PRS to produce the RSS. The first row of an OS matrix modulates reference symbols R1 in the first OFDM symbol, and the second row of an OS matrix modulates reference symbols R2 in the second OFDM symbol.

The purpose of this OS design is that orthogonality among the OSs is not only achieved over the frequency dimension, as shown by the subgrid denoted "case 1" in FIG. 1, but also by using neighboring reference symbols in the time dimension, as shown by the subgrids denoted "case 2" and "case 3" in FIG. 1. These cases are further defined below.

Such orthogonality property can be utilized in the channel estimation using despreading. In despreading according to the related art, 3 received reference symbols were correlated with the transmitted reference symbol sequence in those symbols, which generates one single output value. If the channel is constant over the subgrid (i.e., the rectangular area in the time/frequency plane that contains the 3 despread reference symbols), the output of the despreading may then represent the channel value, for the subgrid over which the sequences were despread. To capture the varying channel, such subgrids should not be too large. This method is in contrast to channel estimation not using despreading, where the reference symbols are just remodulated with the transmitted sequence and interpolation is used between subcarriers.

It can be easily verified that the OSs above achieve orthogonal despreading over subgrids from the whole definition grid, by:

Despreading three contiguous RS symbols for any row (case 1).
Despreading two contiguous RS symbols in a row and one RS symbol in the next row (case 2).
Despreading one RS symbol in a row and two contiguous RS symbols in the next row (case 3).

These three subgrids (cases) are depicted in FIG. 1.

The orthogonality of despreading is obtained since each of the subgrids contains all the 3 elements of one row of the OS matrix (and the rows of the different OSs are orthogonal). The OSs are therefore constructed so that all the elements of a row of the OSs may be obtained by despreading RS symbols according to any one of case 1, case 2 and case 3.

For the six-sector cell case in NTT DoCoMo, it was suggested to reuse the three OSs, so that the same OS is reused in mutually opposite sectors in the same cell. Thus, sector k+1 obtains a sequence $$OS^{(k)} = OS^{(k \bmod 3)}, k=0, 1, \ldots, 5.$$

Hence, orthogonality is achieved between contiguous sectors in the same cell. However, as this set of the two-dimensional sequences $OS^{(k)}$, k=0, 1, ..., 5 contains only 3 different sequences, it cannot be used in the $3^{rd}$ stage of the cell search to unambiguously identify the six sectors.

OS generation and usage has been described above. Hereafter, generation and usage of larger numbers of OSs according to embodiments of the present invention will be described.

Figure 3:
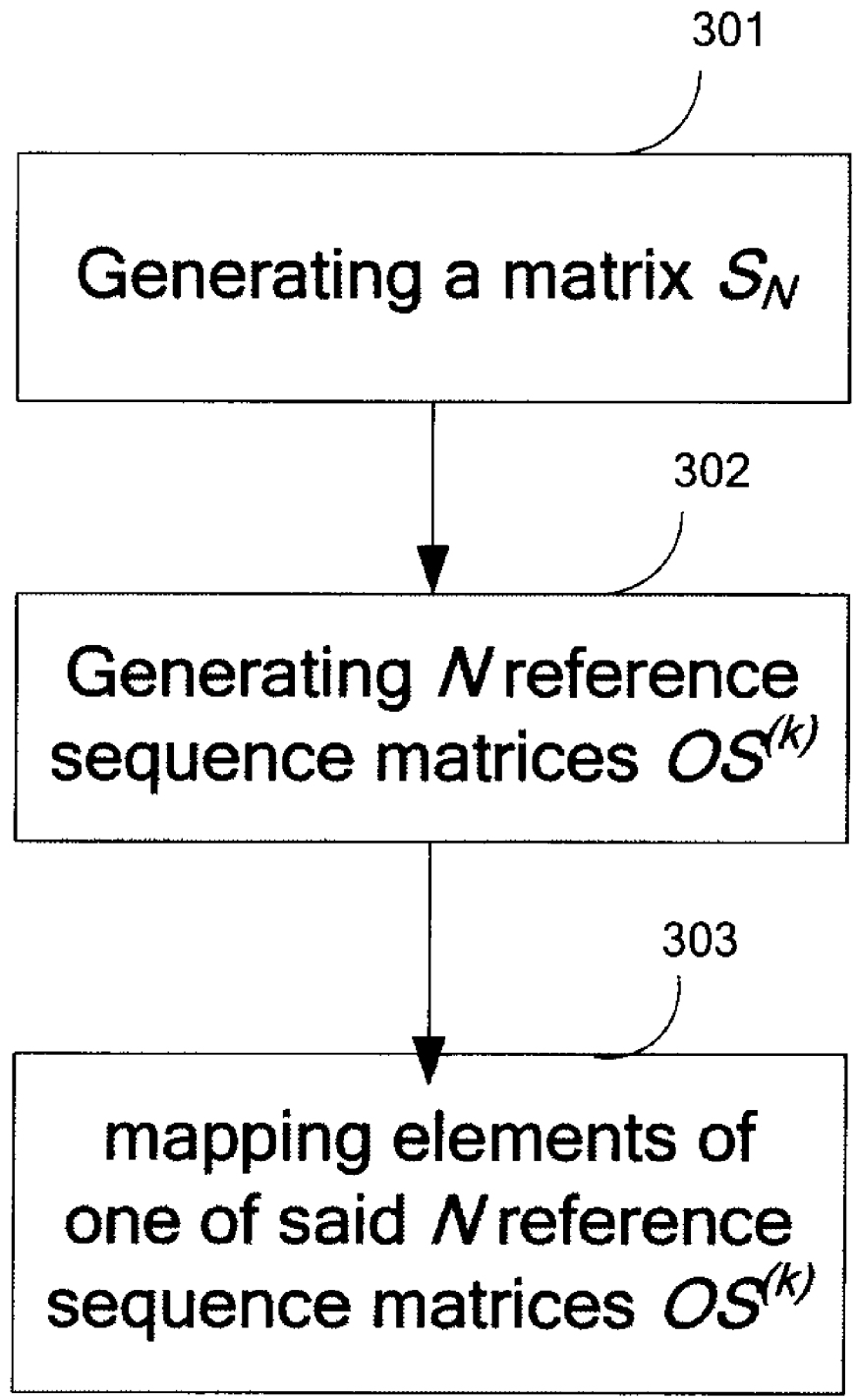
FIG. 3 shows an embodiment of a method for generating reference sequence matrices and for mapping elements of the reference matrices.

FIG. 3 shows an embodiment of a method for generating reference sequence matrices and for mapping elements of the reference matrices. In this embodiment, a method for, in a cellular telecommunication system, generating reference sequence matrices and for mapping elements of said reference sequence matrices to reference signal positions having predetermined locations in two-dimensional multi-carrier time-frequency symbol spaces is disclosed. According to the method, a matrix $S_N$ of dimension N×N having N orthogonal rows or columns and orthogonal parts of rows or columns, respectively, N being a positive integer >3, is generated. N reference sequence matrices $OS^{(k)}$, k=0, ..., N−1, are then generated by forming rows or columns of the kth reference sequence matrix $OS^{(k)}$ based on at least part of the (k+1)th row or column, respectively, of said orthogonal matrix $S_N$. Further, in a cell, within a given time period, mapping elements of one of said N reference sequence matrices $OS^{(k)}$ to reference signal positions having predetermined locations in two-dimensional multi-carrier time-frequency symbol spaces.

The generation of OSs according to embodiments of the invention is based on the use of an orthogonal set of composite sequences obtained as the Kronecker product A ⊗ B (defined below) of two orthogonal matrices A and B, where the matrix A is intended to provide the orthogonality between the reference sequences in the same cell ID group, while the matrix B is intended to provide orthogonal despreading operation within small subsets of reference sequences, where each such subset of reference sequences is allocated to the cells under control of the same Node B.

Some embodiments include a design of one-dimensional orthogonal sequences, described by a row or a column of a matrix $S_N$, from which two-dimensional sequences, described by matrices OS s, are constructed. The OSs are then mapped to the pilot symbols.

In OFDM systems, pilot patterns can appear in many different forms. In general, any subset of the resource elements in the time-frequency grid can be selected for the transmission of pilot symbols.

In many applications, the selected pilot pattern follows a regular structure, in the sense that the Cartesian structure of the discrete time-frequency grid is reflected in the choice of pilot pattern. In particular the use of lattice structures for pilot patterns is common. Mathematically, a lattice structure defines a discrete additive subgroup on $R^2$. In such a lattice structure, the set of resource elements used for pilot symbols can be written as $$x = m_1 a_1 + m_2 a_2,$$

where $m_1$ and $m_2$ are integers and $a_1$ and $a_2$ are independent elements of the grid, corresponding to the basis of the lattice. These lattice structures conserve in a sense the Cartesian structure of the time-frequency resource grid.

Some embodiments relate to pilot structures that can be described by lattices. In these situations the mapping of the 2-dimensional pilot sequences may be done straightforwardly from a matrix description onto the resource elements used for pilot symbols.

The mapping is then performed orderly, meaning that entries of the matrix OS are mapped row-wise to row-structures (along vector $a_1$) in the lattice and column-wise to column-structures along vector $a_2$) in the lattice.

According to some embodiments, the orthogonal matrix $S_N$ is, as stated above, obtained as the Kronecker product $A \otimes B$ of orthogonal matrix $A$ of dimension $M \times M$ and orthogonal matrix $B$ of dimension $L \times L$. The matrix $A$ is intended to provide the orthogonality between the reference sequences in the same cell ID group, while the matrix $B$ is intended to provide orthogonal despreading operation within small subsets of reference sequences, where each such subset of reference sequences is allocated to the cells of the Node B.

Mathematically, the Kronecker product $A \otimes B$ for $A$ being an r-by-n matrix and $B$ being a p-by-q matrix, is a rp-by-nq matrix:

$$A \otimes B = \begin{pmatrix} a_{11}B & \cdots & a_{1n}B \\ \vdots & \ddots & \vdots \\ a_{r1}B & \cdots & a_{rn}B \end{pmatrix}.$$

Thus, mathematically, the orthogonal matrix $S_N$ can be represented as:

$$S_N = A \otimes B = \begin{pmatrix} a_{11}B & \cdots & a_{1M}B \\ \vdots & \ddots & \vdots \\ a_{M1}B & \cdots & a_{MM}B \end{pmatrix}. \quad \text{Equation (1)}$$

If the matrix $A$ is Silvester-type Hadamard matrix of size $2^m \times 2^m$, m is larger than 0, it can be obtained recursively from the Silvester-type Hadamard matrix of size $2^{m-1} \times 2^{m-1}$. Thereby, $S_N$ can also be generated by recursion.

The starting matrix for the recursion is of size $2 \times 2$, and is given by:

$$H_2 = \begin{pmatrix} 1 & 1 \\ 1 & -1 \end{pmatrix},$$

and the recursion follows:

$$H_{2^m} = \begin{pmatrix} H_{2^{m-1}} & H_{2^{m-1}} \\ H_{2^{m-1}} & -H_{2^{m-1}} \end{pmatrix}.$$

Thus, if $A = H_M$, then the matrix $S_N$, $N = ML$, $M = 2^m$, can be obtained from the recursion:

$$S_{2Ll} = \begin{pmatrix} S_{Ll} & S_{Ll} \\ S_{Ll} & -S_{Ll} \end{pmatrix}, l = 1, 2, 4 \ldots, 2^{m-1},$$

where $S_L = B$.

Consider an $(N/2) \times (N/2)$ matrix $S_{N/2}$ comprising $N/2$ orthogonal rows and columns. An $N \times N$ matrix $S_N$ comprising $N$ orthogonal rows and columns is constructed as:

$$S_N = \begin{pmatrix} S_{N/2} & S_{N/2} \\ S_{N/2} & -S_{N/2} \end{pmatrix}. \quad \text{Equation (2)}$$

It is also possible to generalize the method to non-square matrices, fulfilling $SS^H = I$, where H denotes a Hermitian transpose. With the construction of equation (2), the increased length of the sequence, from $N/2$ to $N$, has been utilized for maximizing the number of orthogonal rows and columns of $S_N$. Each row in $S_N$ could therefore denote a sequence, allocated to a certain cell. Thereby, it is possible to detect any of $N$ orthogonal sequences of length $N$. An example of this construction is for L=3, M=2 and N=6 given by the matrix:

$$S_6 = \begin{pmatrix} 1 & 1 & 1 & 1 & 1 & 1 \\ 1 & e^{j2\pi/3} & e^{j4\pi/3} & 1 & e^{j2\pi/3} & e^{j4\pi/3} \\ 1 & e^{j4\pi/3} & e^{j2\pi/3} & 1 & e^{j4\pi/3} & e^{j2\pi/3} \\ 1 & 1 & 1 & -1 & -1 & -1 \\ 1 & e^{j2\pi/3} & e^{j4\pi/3} & -1 & -e^{j2\pi/3} & -e^{j4\pi/3} \\ 1 & e^{j4\pi/3} & e^{j2\pi/3} & -1 & -e^{j4\pi/3} & -e^{j2\pi/3} \end{pmatrix}. \quad \text{Equation (3)}$$

Thus, these sequences are orthogonal over their full period, i.e., over a whole row or column. Also, due to the recursion equation (2), some of them are also orthogonal over parts of a period, i.e., over parts of rows or columns. This property is used in the channel estimation through the despreading operation. In particular, due to the recursive construction of equation (3), it follows that orthogonality can be achieved among some of the rows extracted from $S_N$, but considering only $N/2$ columns. Therefore, two-dimensional OS design based on equation (2), may achieve orthogonality over certain two-dimensional subgrids. Thus, two-dimensional OS design based on equation (2) fulfills design property 2 above, i.e., that some of the OSs should be orthogonal over a subgrid of the whole two-dimensional definition grid.

Since equation (3) is constructed from an orthogonal matrix of size 3×3, it should be possible to achieve orthogonality on parts of a row or column in equation (3). For example, in columns 1 to 3, row 1 is orthogonal to all rows except row 4, which is the same as row 1 in those columns. For other columns, e.g., columns 2 to 4, row 1 is orthogonal to rows 2 and 3 only. It is easy to see that this effect follows from the different signs in the different rows.

Therefore, in order to maximize the number of orthogonal sequences of length 3, the first three (or last three) rows define the subset of sequences that could preferably be allocated to the cells under the control of one Node B. From equation (1), it follows that to maintain the orthogonality properties over L elements (i.e., to fulfill the conditions of case 1 to case 3 defined above), the subset of L sequences allocated to the cells of a Node B should correspond to the same row (or column) of matrix A.

Cell-specific information may be carried by the sequences if it can be assumed that not all of them, but only a smaller subset of all sequences, will be used in the cells of a Node B. In equation (3), the sequences can be divided into two subsets.

By taking as convention to allocate either the sequences of row (or column) 1 to 3 to the cell, or the sequences of row (or column) 4 to 6 to the cell, information is implicitly encoded by the choice of a subset from which the OS are to be used. The information is then decoded by detection of which subset the OS belongs to.

For example, if all cells of a Node B have the same antenna configuration, sequences from the first three rows could be used for describing one antenna configuration and the last three rows describe another antenna configuration. Thereby, the antenna configuration information is obtained once the OS is detected. Thus, it is according to embodiments of the present invention possible to convey cell specific information by choosing an OS from a specific subset of the OSs. In a conventional system, this cell specific information would have had to be encoded and transmitted in a normal fashion, resulting in signaling overhead. Embodiments of the present invention thus mitigate overhead in the system.

Further, the transmission of cell specific information according to embodiments of the present invention may also have a positive effect on detection performance for other channels, for instance, a broadcast channel. The conventional alternative to the implicit encoding and transmission of cell specific information according to embodiments of the present invention would be to broadcast the cell specific information, e.g. numbers of antennas used, on the broadcast channel. However, at the moment when the signals received on the broadcast channel are to be detected, the receiver is unaware of, e.g., the number of antennas used since this information has not yet been detected. A conventional receiver would only after detection of the broadcast channel know the number of antennas used and would thus not be able to use this information for detecting the broadcast channel itself. In a receiver according to embodiments of the present invention, however, the cell specific information, e.g. the number of antennas, is known by the receiver already after cell search and may be used by the receiver to improve detection performance for all channels, including the broadcast channel.

Further, as previously explained, by this definition of the subsets, the orthogonality properties of case 1 to case 3 above are also maintained for despreading sequences within a subset.

Moving on to generation of OS matrices, suppose that according to equation (2), there is a matrix $S_N$, $N=ML$. Depending on over which time-frequency grids orthogonality should be achieved, different constructions of the two-dimensional orthogonal sequences $OS^{(k)}$, $k=0, \ldots, N-1$ from the matrix $S_N$ can be used.

To be able to maintain orthogonality among the N sequences, the whole length of the sequences is needed. Thus, the OS matrix should contain at least N elements. Thereby, a whole row (or column) of $S_N$ may be allocated into an OS.

Moreover, the construction of the OS should be done so that it is possible to achieve orthogonality among some of the OSs on subgrids, e.g., of length L<N. For keeping the subgrids sufficiently small, this means that L consecutive elements of a row in $S_N$ should be located close together in the OS. Then elements located in the vicinity of each other in the OS matrix should be mapped to reference signal positions located in the vicinity of each other in the OFDM time-frequency signal space.

Below, four examples of methods for generation of OSs from rows or columns in $S_N$ are described, in particular suitable for the pilot pattern of FIG. 2, which is defined so that the reference symbol subcarriers of the second reference symbol are staggered in frequency position. These four methods use repetition, cyclic shifts, permutations and row splitting, respectively, for generation of OSs. In all of these methods, rows or columns in the OSs are created by using rows or columns of $S_N$, so that rows or columns or parts of rows and columns from $S_N$ are either copied to the rows or columns of the respective OSs or are first transformed according to the four methods and then transferred to the rows or columns of the respective OSs.

Repetition

An OS can be constructed by repeating a row from $S_N$, so that:

$$OS^{(k)} = \begin{pmatrix} S_N(k+1,1) & \ldots & S_N(k+1,N) \\ S_N(k+1,1) & \ldots & S_N(k+1,N) \\ \vdots & \vdots & \vdots \end{pmatrix}, k=0, 1, \ldots, N-1,$$

where $S_N(m,n)$ denotes the element in row m and column n of $S_N$. This type of OS is suited for having row-wise orthogonality according to the condition of case 1 (defined above). By considering a subgrid of L consecutive symbols from any row, orthogonal despreading among some of the OSs is possible. However, as noted above, the number of orthogonal sequences of length L depends on the choice of columns. In general, to maximize the number of orthogonal sequences of length L among all of the OSs, the L contiguous symbols should be taken from any of the columns described by the sets $\{1+Lj, \ldots, L(j+1)\}$, $j=0, 1, \ldots, M-1$.

Cyclic Shifts

To provide for orthogonality over subgrids, containing L symbols, defined over two dimensions (i.e., conditions of case 2 and case 3 defined above), cyclic shifts (of a suitable number of steps) in different rows of the OS may be introduced. This is exemplified below, where the second row contains a cyclic shift of one step of the first row:

$$OS^{(k)} = \begin{pmatrix} S_N(k+1,1) & \ldots & S_N(k+1,N) \\ S_N(k+1,N) & \ldots & S_N(k+1,N-1) \\ S_N(k+1,1) & \ldots & S_N(k+1,N) \\ \vdots & \vdots & \vdots \end{pmatrix},$$

$$k = 0, 1, \ldots, N.$$

As an example, if we generate $S_{12}$ from equation (3), the following 2×12 OSs or transposes of OSs may be obtained by:

$$OS^{(0)} = \begin{pmatrix} 1 & 1 \\ 1 & 1 \\ 1 & 1 \\ 1 & 1 \\ 1 & 1 \\ 1 & 1 \\ 1 & 1 \\ 1 & 1 \\ 1 & 1 \\ 1 & 1 \\ 1 & 1 \\ 1 & 1 \end{pmatrix}^T, OS^{(1)} = \begin{pmatrix} 1 & e^{j4\pi/3} \\ e^{j2\pi/3} & 1 \\ e^{j4\pi/3} & e^{j2\pi/3} \\ 1 & e^{j4\pi/3} \\ e^{j2\pi/3} & 1 \\ e^{j4\pi/3} & e^{j2\pi/3} \\ 1 & e^{j4\pi/3} \\ e^{j2\pi/3} & 1 \\ e^{j4\pi/3} & e^{j2\pi/3} \\ 1 & e^{j4\pi/3} \\ e^{j2\pi/3} & 1 \\ e^{j4\pi/3} & e^{j2\pi/3} \end{pmatrix}^T,$$

$$OS^{(2)} = \begin{pmatrix} 1 & e^{j2\pi/3} \\ e^{j4\pi/3} & 1 \\ e^{j2\pi/3} & e^{j4\pi/3} \\ 1 & e^{j2\pi/3} \\ e^{j4\pi/3} & 1 \\ e^{j2\pi/3} & e^{j4\pi/3} \\ 1 & e^{j2\pi/3} \\ e^{j4\pi/3} & 1 \\ e^{j2\pi/3} & e^{j4\pi/3} \\ 1 & e^{j2\pi/3} \\ e^{j4\pi/3} & 1 \\ e^{j2\pi/3} & e^{j4\pi/3} \end{pmatrix}^T, \quad OS^{(3)} = \begin{pmatrix} 1 & -1 \\ 1 & 1 \\ 1 & 1 \\ -1 & 1 \\ -1 & -1 \\ -1 & -1 \\ 1 & -1 \\ 1 & 1 \\ 1 & 1 \\ -1 & 1 \\ -1 & -1 \\ -1 & -1 \end{pmatrix}^T,$$

$$OS^{(4)} = \begin{pmatrix} 1 & -e^{j4\pi/3} \\ e^{j2\pi/3} & 1 \\ e^{j4\pi/3} & e^{j2\pi/3} \\ -1 & e^{j4\pi/3} \\ -e^{j2\pi/3} & -1 \\ -e^{j4\pi/3} & -e^{j2\pi/3} \\ 1 & -e^{j4\pi/3} \\ e^{j2\pi/3} & 1 \\ e^{j4\pi/3} & e^{j2\pi/3} \\ -1 & e^{j4\pi/3} \\ -e^{j2\pi/3} & -1 \\ -e^{j4\pi/3} & -e^{j2\pi/3} \end{pmatrix}^T, \quad OS^{(5)} = \begin{pmatrix} 1 & -e^{j2\pi/3} \\ e^{j4\pi/3} & 1 \\ e^{j2\pi/3} & e^{j4\pi/3} \\ -1 & e^{j2\pi/3} \\ -e^{j4\pi/3} & -1 \\ -e^{j2\pi/3} & -e^{j4\pi/3} \\ 1 & -e^{j2\pi/3} \\ e^{j4\pi/3} & 1 \\ e^{j2\pi/3} & e^{j4\pi/3} \\ -1 & e^{j2\pi/3} \\ -e^{j4\pi/3} & -1 \\ -e^{j2\pi/3} & -e^{j4\pi/3} \end{pmatrix}^T,$$

$$OS^{(6)} = \begin{pmatrix} 1 & -1 \\ 1 & 1 \\ 1 & 1 \\ 1 & 1 \\ 1 & 1 \\ 1 & 1 \\ -1 & 1 \\ -1 & -1 \\ -1 & -1 \\ -1 & -1 \\ -1 & -1 \\ -1 & -1 \end{pmatrix}^T, \quad OS^{(7)} = \begin{pmatrix} 1 & -e^{j4\pi/3} \\ e^{j2\pi/3} & 1 \\ e^{j4\pi/3} & e^{j2\pi/3} \\ 1 & e^{j4\pi/3} \\ e^{j2\pi/3} & 1 \\ e^{j4\pi/3} & e^{j2\pi/3} \\ -1 & e^{j4\pi/3} \\ -e^{j2\pi/3} & -1 \\ -e^{j4\pi/3} & -e^{j2\pi/3} \\ -1 & e^{j4\pi/3} \\ -e^{j2\pi/3} & -1 \\ -e^{j4\pi/3} & -e^{j2\pi/3} \end{pmatrix}^T,$$

$$OS^{(8)} = \begin{pmatrix} 1 & -e^{j2\pi/3} \\ e^{j4\pi/3} & 1 \\ e^{j2\pi/3} & e^{j4\pi/3} \\ 1 & e^{j2\pi/3} \\ e^{j4\pi/3} & 1 \\ e^{j2\pi/3} & e^{j4\pi/3} \\ -1 & e^{j2\pi/3} \\ -e^{j4\pi/3} & -1 \\ -e^{j2\pi/3} & -e^{j4\pi/3} \\ -1 & e^{j2\pi/3} \\ -e^{j4\pi/3} & -1 \\ -e^{j2\pi/3} & -e^{j4\pi/3} \end{pmatrix}^T, \quad OS^{(9)} = \begin{pmatrix} 1 & 1 \\ 1 & 1 \\ 1 & 1 \\ -1 & 1 \\ -1 & -1 \\ -1 & -1 \\ -1 & -1 \\ -1 & -1 \\ -1 & -1 \\ 1 & -1 \\ 1 & 1 \\ 1 & 1 \end{pmatrix}^T,$$

$$OS^{(10)} = \begin{pmatrix} 1 & e^{j4\pi/3} \\ e^{j2\pi/3} & 1 \\ e^{j4\pi/3} & e^{j2\pi/3} \\ -1 & e^{j4\pi/3} \\ -e^{j2\pi/3} & -1 \\ -e^{j4\pi/3} & -e^{j2\pi/3} \\ -1 & -e^{j4\pi/3} \\ -e^{j2\pi/3} & -1 \\ -e^{j4\pi/3} & -e^{j2\pi/3} \\ 1 & -e^{j4\pi/3} \\ e^{j2\pi/3} & 1 \\ e^{j4\pi/3} & e^{j2\pi/3} \end{pmatrix}^T, \quad OS^{(11)} = \begin{pmatrix} 1 & e^{j2\pi/3} \\ e^{j4\pi/3} & 1 \\ e^{j2\pi/3} & e^{j4\pi/3} \\ -1 & e^{j2\pi/3} \\ -e^{j4\pi/3} & -1 \\ -e^{j2\pi/3} & -e^{j4\pi/3} \\ -1 & -e^{j2\pi/3} \\ -e^{j4\pi/3} & -1 \\ -e^{j2\pi/3} & -e^{j4\pi/3} \\ 1 & -e^{j2\pi/3} \\ e^{j4\pi/3} & 1 \\ e^{j2\pi/3} & e^{j4\pi/3} \end{pmatrix}^T,$$

where $(\bullet)^T$ denotes matrix transpose.

Permutations

As another way to provide for orthogonality over subgrids, containing L symbols, defined over two dimensions, permutations in different rows may be introduced. In particular, we shall consider permutations by means of cyclic shifts on parts of rows. The rows of the OS are cyclically shifted versions of the first row of the OS, where a cyclic shift is done on each segment of L symbols. Thus, each row is divided into M segments of length L and each such segment is cyclically shifted a suitable number of steps.

This is exemplified below for L=3, where it can be seen that in the second row, there is one cyclic shift of one step for each segment of 3 symbols:

$$OS^{(k)} = \begin{pmatrix} S_N(k+1,1) & S_N(k+1,2) & S_N(k+1,3) & S_N(k+1,4) & S_N(k+1,5) & S_N(k+1,6) & \dots \\ S_N(k+1,3) & S_N(k+1,1) & S_N(k+1,2) & S_N(k+1,6) & S_N(k+1,4) & S_N(k+1,5) & \dots \\ S_N(k+1,1) & S_N(k+1,2) & S_N(k+1,3) & S_N(k+1,4) & S_N(k+1,5) & S_N(k+1,6) & \dots \\ \vdots & \vdots & \vdots & \vdots & \vdots & \vdots & \ddots \end{pmatrix}.$$

As an example, if we generate $S_{12}$ from equation (3), the following 2×12 OSs or transposes of OSs may be obtained by:

$$OS^{(0)} = \begin{pmatrix} 1 & 1 \\ 1 & 1 \\ 1 & 1 \\ 1 & 1 \\ 1 & 1 \\ 1 & 1 \\ 1 & 1 \\ 1 & 1 \\ 1 & 1 \\ 1 & 1 \\ 1 & 1 \\ 1 & 1 \end{pmatrix}^T, \quad OS^{(1)} = \begin{pmatrix} 1 & e^{j4\pi/3} \\ e^{j2\pi/3} & 1 \\ e^{j4\pi/3} & e^{j2\pi/3} \\ 1 & e^{j4\pi/3} \\ e^{j2\pi/3} & 1 \\ e^{j4\pi/3} & e^{j2\pi/3} \\ 1 & e^{j4\pi/3} \\ e^{j2\pi/3} & 1 \\ e^{j4\pi/3} & e^{j2\pi/3} \\ 1 & e^{j4\pi/3} \\ e^{j2\pi/3} & 1 \\ e^{j4\pi/3} & e^{j2\pi/3} \end{pmatrix}^T,$$

$$OS^{(2)} = \begin{pmatrix} 1 & e^{j2\pi/3} \\ e^{j4\pi/3} & 1 \\ e^{j2\pi/3} & e^{j4\pi/3} \\ 1 & e^{j2\pi/3} \\ e^{j4\pi/3} & 1 \\ e^{j2\pi/3} & e^{j4\pi/3} \\ 1 & e^{j2\pi/3} \\ e^{j4\pi/3} & 1 \\ e^{j2\pi/3} & e^{j4\pi/3} \\ 1 & e^{j2\pi/3} \\ e^{j4\pi/3} & 1 \\ e^{j2\pi/3} & e^{j4\pi/3} \end{pmatrix}^T, \quad OS^{(3)} = \begin{pmatrix} 1 & 1 \\ 1 & 1 \\ 1 & 1 \\ -1 & -1 \\ -1 & -1 \\ -1 & -1 \\ 1 & 1 \\ 1 & 1 \\ 1 & 1 \\ -1 & -1 \\ -1 & -1 \\ -1 & -1 \end{pmatrix}^T,$$

$$OS^{(4)} = \begin{pmatrix} 1 & e^{j4\pi/3} \\ e^{j2\pi/3} & 1 \\ e^{j4\pi/3} & e^{j2\pi/3} \\ -1 & -e^{j4\pi/3} \\ -e^{j2\pi/3} & -1 \\ -e^{j4\pi/3} & -e^{j2\pi/3} \\ 1 & e^{j4\pi/3} \\ e^{j2\pi/3} & 1 \\ e^{j4\pi/3} & e^{j2\pi/3} \\ -1 & -e^{j4\pi/3} \\ -e^{j2\pi/3} & -1 \\ -e^{j4\pi/3} & -e^{j2\pi/3} \end{pmatrix}^T, \quad OS^{(5)} = \begin{pmatrix} 1 & e^{j2\pi/3} \\ e^{j4\pi/3} & 1 \\ e^{j2\pi/3} & e^{j4\pi/3} \\ -1 & -e^{j2\pi/3} \\ -e^{j4\pi/3} & -1 \\ -e^{j2\pi/3} & -e^{j4\pi/3} \\ 1 & e^{j2\pi/3} \\ e^{j4\pi/3} & 1 \\ e^{j2\pi/3} & e^{j4\pi/3} \\ -1 & -e^{j2\pi/3} \\ -e^{j4\pi/3} & -1 \\ -e^{j2\pi/3} & -e^{j4\pi/3} \end{pmatrix}^T,$$

$$OS^{(6)} = \begin{pmatrix} 1 & 1 \\ 1 & 1 \\ 1 & 1 \\ 1 & 1 \\ 1 & 1 \\ 1 & 1 \\ -1 & -1 \\ -1 & -1 \\ -1 & -1 \\ -1 & -1 \\ -1 & -1 \\ -1 & -1 \end{pmatrix}^T, \quad OS^{(7)} = \begin{pmatrix} 1 & e^{j4\pi/3} \\ e^{j2\pi/3} & 1 \\ e^{j4\pi/3} & e^{j2\pi/3} \\ 1 & e^{j4\pi/3} \\ e^{j2\pi/3} & 1 \\ e^{j4\pi/3} & e^{j2\pi/3} \\ -1 & -e^{j4\pi/3} \\ -e^{j2\pi/3} & -1 \\ -e^{j4\pi/3} & -e^{j2\pi/3} \\ -1 & -e^{j4\pi/3} \\ -e^{j2\pi/3} & -1 \\ -e^{j4\pi/3} & -e^{j2\pi/3} \end{pmatrix}^T,$$

$$OS^{(8)} = \begin{pmatrix} 1 & e^{j2\pi/3} \\ e^{j4\pi/3} & 1 \\ e^{j2\pi/3} & e^{j4\pi/3} \\ 1 & e^{j2\pi/3} \\ e^{j4\pi/3} & 1 \\ e^{j2\pi/3} & e^{j4\pi/3} \\ -1 & -e^{j2\pi/3} \\ -e^{j4\pi/3} & -1 \\ -e^{j2\pi/3} & -e^{j4\pi/3} \\ -1 & -e^{j2\pi/3} \\ -e^{j4\pi/3} & -1 \\ -e^{j2\pi/3} & -e^{j4\pi/3} \end{pmatrix}^T, \quad OS^{(9)} = \begin{pmatrix} 1 & 1 \\ 1 & 1 \\ 1 & 1 \\ -1 & -1 \\ -1 & -1 \\ -1 & -1 \\ -1 & -1 \\ -1 & -1 \\ -1 & -1 \\ 1 & 1 \\ 1 & 1 \\ 1 & 1 \end{pmatrix}^T,$$

$$OS^{(10)} = \begin{pmatrix} 1 & e^{j4\pi/3} \\ e^{j2\pi/3} & 1 \\ e^{j4\pi/3} & e^{j2\pi/3} \\ -1 & -e^{j4\pi/3} \\ -e^{j2\pi/3} & -1 \\ -e^{j4\pi/3} & -e^{j2\pi/3} \\ -1 & -e^{j4\pi/3} \\ -e^{j2\pi/3} & -1 \\ -e^{j4\pi/3} & -e^{j2\pi/3} \\ 1 & e^{j4\pi/3} \\ e^{j2\pi/3} & 1 \\ e^{j4\pi/3} & e^{j2\pi/3} \end{pmatrix}^T, \quad OS^{(11)} = \begin{pmatrix} 1 & e^{j2\pi/3} \\ e^{j4\pi/3} & 1 \\ e^{j2\pi/3} & e^{j4\pi/3} \\ -1 & -e^{j4\pi/3} \\ -e^{j4\pi/3} & -1 \\ -e^{j2\pi/3} & -e^{j4\pi/3} \\ -1 & -e^{j2\pi/3} \\ -e^{j4\pi/3} & -1 \\ -e^{j2\pi/3} & -e^{j4\pi/3} \\ 1 & e^{j2\pi/3} \\ e^{j4\pi/3} & 1 \\ e^{j2\pi/3} & e^{j4\pi/3} \end{pmatrix}^T.$$

As for the OSs generated by cyclic shifts above, this OS design has the advantage that orthogonality may be achieved according to the condition of case 1, but also according to the conditions of case 2 and case 3.

Row/Column Splitting

In the above OS design examples of repetition, cyclic shifts and permutations, one full row or of $S_N$ is contained in one row of the OS matrix. Further generalization can be done so that a row (or column) from $S_N$ is divided into several rows (or columns) in the OS matrix. For example, a 2×12 OS may be constructed from one row of a $S_{24}$ matrix, wherein the first row of the OS contains the first 12 elements of the row in $S_{24}$, and the second row of the OS contains the last 12 elements of the row of $S_{24}$. The rows (or columns) in the OS may also in this case contain cyclic shifts to maintain orthogonal despreading.

In the above exemplified methods, example OSs have been showed that OSs are generated row-wise from rows in $S_N$. However, as stated above, corresponding methods generating OSs column-wise from columns in $S_N$ may also be performed. As can be understood by a skilled person, this may be done in correspondence with the above shown examples.

Further, as stated above, the matrix from which the OSs are generated may also be a matrix S of dimension $N_1 \times N_2$. Then, a number of $\min(N_1, N_2)$ orthogonal sequences of length max $(N_1, N_2)$ could be generated in a corresponding manner, as clear to a skilled person.

It has above been described how a large number of OSs can be generated in an efficient and relatively low complex manner by use of recursive generation of the matrix $S_N$. In the following, allocation of the generated OSs to cells is described.

In terms of orthogonality for the despreading operation, the difference between the OSs in the prior art and the constructions of embodiments of the present invention, is that the number of orthogonal sequences on a subgrid, depends on which subgrid that is considered. This is a consequence of having more than L sequences, i.e., N>L. In the prior art, there were 3 OSs of length 3 (N=L). Therefore, if we follow the principles of the prior art and only allocate L out of the N OS to cells of a Node B, we may maintain the exact same orthogonality over subgrids of size L.

The OSs can be allocated to the cells in different ways. If the OSs should not convey any cell-specific information, any of the N OS could be allocated to a cell. On one hand, this could avoid OS reuse within the cells of a Node B, for Node Bs controlling many cells. On the other hand, as exemplified previously, this implies that for the despreading, the location of the subgrids will have an impact on the number of orthogonal sequences.

Alternatively, as discussed above, the OSs can be divided into different subsets, where the cells of a Node B may only be allocated OSs from the same subset. On one hand, this means that OS reuse within cells of a Node B, may be necessary for Node Bs controlling many cells. On the other hand, the allocation may be done so that the location of the subgrids will not have an impact on the orthogonality and additionally, cell-specific information can be encoded and decoded by choosing and identifying the used subset.

Consider the above examples with 12 OSs. If we define the subsets $\Omega_k = \{OS^{3(k-1)}, OS^{1+3(k-1)}, OS^{2+3(k-1)}\}$, k=1, 2, 3, 4, it can be verified that the sign of an element in any position of $OS^{(m)}$ is the same for all $OS^{(m)}$. Thus, exactly the same orthogonality conditions as in NTT DoCoMo are preserved in embodiments of the present invention if the three OSs are chosen from one of the index sets $\Omega_k$. As in the prior art, for such an allocation it does not matter over which subgrids the despreading is done and the number of OSs will not vary depending on the location of the subgrid. These preserved orthogonality characteristics of embodiments of the present invention minimize the pilot-to-pilot interference for pilots from cells controlled by a Node B, which is very advantageous.

The cell specific information k is obtained by identifying to which index set the detected OS belongs. As stated above, the cell specific information k may, for instance, identify information relating to an antenna configuration, e.g. the number of antennas, used in a cell.

Further, if the time-frequency grid for reference symbols does not have the same dimension as the dimension for the OSs, it is possible to apply the recursion equation (2) again, which would increase the dimension of the OSs, as well as increasing the number of sequences. However, in general, repetition of an OS can always be done, simply by concatenating the OS matrix so that $$\begin{pmatrix} OS^{(k)} & \cdots & OS^{(k)} \\ \vdots & \ddots & \vdots \\ OS^{(k)} & \cdots & OS^{(k)} \end{pmatrix}$$

achieves a proper size.

Further, a transceiver implementing the method according to some embodiments disclosed herein is provided. The transceiver includes means for implementing the steps of the method, i.e., means for generating $S_N$, means for generating OSs and means for mapping elements of the generated OSs on time-frequency symbols spaces of the cells. Also, a telecommunication system including at least one such transceiver is further disclosed. The transceiver and the telecommunication system according to embodiments of the invention may be adapted to perform any of the steps of the method of embodiments of the invention. A trivial requirement is, of course, that such steps do involve the transceiver or the telecommunication system, respectively.

Matrix generation and mapping according to embodiments of the invention may be modified by those skilled in the art, as compared to the exemplary embodiments described above.

The present disclosure aims to provide a solution having less signaling overhead, more possibilities to optimize cell search and less pilot-to-pilot OS reuse interference between neighboring cells than the solutions known in the prior art.

The method, the transceiver and the telecommunication system according to the present invention are characterized in that a larger number of OSs, N>3, is generated and mapped than in the conventional solutions. The OSs generated according to the present disclosure are further generated and their elements mapped on reference signal positions so that orthogonality features are achieved for the reference sequences.

The generation of more than three OSs according to embodiments of the present disclosure has a number of advantages. One important advantage is that cell search may be optimized because of better possibilities for choosing suitable numbers of PRSs and OSs to use than in the related art. This possible optimization of the cell search process results in better cell search performance.

Another great advantage of generating more than three OSs according to embodiments of the present invention is that the increased number of OSs makes it possible to implicitly encode additional cell-specific information to be detected in the cell search. For instance, information relating to the antenna configuration of the cell may be encoded and transmitted to a UE in this way. The implicit encoding of the cell specific information is, according to this embodiment of the invention, done simply by choosing one OS, which is part of a certain subset of OSs, to be used in a cell.

According to embodiments of the present invention, the generated OSs are divided into subsets and these subsets are then associated with a specific cell information. For a UE to be informed about, e.g., which antenna configuration that is used in a cell, the UE just needs to perform cell search and determine which OS that is used. When this OS is identified, the UE also knows which antenna configuration that is associated to the subset that OS is part of, and thus which antenna configuration that is used. This information is, according to embodiments of the present invention, conveyed to the UE without using any extra radio resources at all, which is a major advantage from a radio resource optimization point of view.

Another great advantage of generating an increased number of OSs is that the increased number of OSs may be used for preventing the need for OS reuse when more than three cells are controlled by one Node B. Not having to reuse OSs in cells under control of a Node B is very advantageous since pilot-to-pilot interference between neighboring cells is a problem in OS reuse systems.

As obvious to a skilled person, a number of other implementations, modifications, variations and/or additions can be made to the above described exemplary embodiments. It is to be understood that the disclosure includes all such other implementations, modifications, variations and/or additions which fall within the scope of the claims.

What is claimed is:

1. A method for generating a reference sequence matrix and mapping elements of the reference sequence matrix to a position of a reference signal used for channel estimation in a cellular telecommunication system, the method comprising:
generating, by a transceiver, a matrix $S_N$ of dimension N×N having N orthogonal rows or columns, with N being a positive integer >3;
generating, by the transceiver, a plurality of reference sequence matrices $OS^{(k)}$, k=0, ..., N−1, from the matrix $S_N$; and
mapping, by the transceiver, elements of at least one of the reference sequence matrices to a position of a reference signal having predetermined locations in a two-dimensional time-frequency symbol space, wherein rows or columns of a kth reference sequence matrix $OS^{(k)}$ are based at least in part on a (k+1)th row or column of the matrix $S_N$.

2. The method according to claim 1, wherein the mapping comprises:
mapping in a cell, within a given time period, elements of at least one of the reference sequence matrices by assigning elements located in vicinity of each other in a mapped reference sequence matrix to locations in vicinity of each other in the two-dimensional time-frequency symbol space.

3. The method according to claim 1, wherein the matrix $S_N$ is generated according to:

$$S_N = A \otimes B = \begin{pmatrix} a_{11}B & \cdots & a_{1M}B \\ \vdots & \ddots & \vdots \\ a_{M1}B & \cdots & a_{MM}B \end{pmatrix},$$

wherein A is an orthogonal matrix of dimension M×M, B is an orthogonal matrix of dimension L×L, and ⊗ denotes a Kronecker product.

4. The method according to claim 3, wherein the matrix $S_N$ is generated from a recursion $$S_{2Ll} = \begin{pmatrix} S_{Ll} & S_{Ll} \\ S_{Ll} & -S_{Ll} \end{pmatrix}, l = 1, 2, 4 \ldots, 2^{m-1},$$

where $S_L$=B, N=ML, M=$2^m$, and m is an integer greater than 0.

5. The method according to claim 4, wherein said matrix B is:

$$B = \begin{pmatrix} 1 & 1 & 1 \\ 1 & e^{j2\pi/3} & e^{j4\pi/3} \\ 1 & e^{j4\pi/3} & e^{j2\pi/3} \end{pmatrix} \cdot e^{j\phi},$$

where $0 \leq \phi < 2\pi$.

6. The method according to claim 4, wherein said matrix B is:

$$B = \begin{pmatrix} 1 & 1 \\ 1 & -1 \end{pmatrix} \cdot e^{j\phi},$$

where $0 \leq \phi < 2\pi$.

7. The method according to claim 1, wherein the mapping further comprises: mapping, for each of a number of cells controlled by a Node B in the cellular telecommunication system, elements of at least one of the reference sequence matrices on the two-dimensional time-frequency symbol space for each cell.

8. The method according to claim 1, wherein the mapping further comprises: mapping elements of at least one of the reference sequence matrices on the two-dimensional time-frequency symbol space of at least two cells controlled by a Node B in the cellular telecommunication system.

9. The method according to claim 1, wherein the reference sequence matrices are arranged in subsets, and reference sequence matrices within each subset are orthogonal.

10. The method according to claim 1, wherein the reference sequence matrices are arranged in subsets, and each subset is associated with a cell specific information, and each subset implicitly encodes the associated cell specific information when each subset is chosen to be used in a cell of the cellular telecommunication system.

11. The method according to claim 10, wherein the associated cell specific information relating to an antenna configuration is used in the cell of the cellular telecommunication system.

12. The method according to claim 1, wherein the two-dimensional time-frequency symbol space is organized in a lattice structure defined as:

$$x = m_1 a_1 + m_2 a_2,$$

where $m_1$ and $m_2$ are integers, and $a_1$ and $a_2$ are independent elements of a time-frequency grid.

13. The method according to claim 1, wherein the kth reference sequence matrix $OS^{(k)}$ is generated using at least one cyclic shift of the (k+1)th row or column of the matrix $S_N$, or at least one cyclic shift on segments of the (k+1)th row or column of the matrix $S_N$.

14. The method according to claim 13, wherein the reference sequence matrices are arranged in subsets defined by:

$$\Omega_k = \{OS^{3(k-1)}, OS^{1+3(k-1)}, OS^{2+3(k-1)}\}, k=1, 2, 3, 4,$$

each subset $\Omega_k$ being associated with information relating to an antenna configuration.

15. The method according to claim 1, wherein the kth reference sequence matrix $OS^{(k)}$ is generated by repeating the (k+1)th row or column of the matrix $S_N$.

16. The method according to claim 1, wherein the mapping comprises assigning elements of concatenations of the reference sequence matrices $$\begin{pmatrix} OS^{(k)} & \cdots & OS^{(k)} \\ \vdots & \ddots & \vdots \\ OS^{(k)} & \cdots & OS^{(k)} \end{pmatrix}.$$

17. The method according to claim 1, wherein more than one row or more than one column of a reference sequence matrix from the plurality of reference sequence matrices is generated by dividing one single row or one single column, respectively, in the matrix $S_N$ into parts, and assigning the divided parts to more than one row or more than one column in the reference sequence matrix.

18. The method according to claim 1, wherein the reference sequence matrices are used for identifying at least part of the cell ID in a cell search procedure.

19. The method according to claim 1, wherein the matrix $S_N$ is of dimension $N_1 \times N_2$ having $N_1$ orthogonal rows or $N_2$ orthogonal columns, $N_1$ and $N_2$ are positive integers, $\min(N_1, N_2) \geq 3$, and the reference sequence matrices $OS^{(k)}$, $k=0, \ldots, \min(N_1, N_2)-1$, are generated from the matrix $S_N$.

20. The method according to claim 1, further comprising: constructing a reference symbol sequence as a product of a pseudo-random sequence and one of the reference sequence matrices $OS^{(k)}$.

21. The method according to claim 1, wherein the mapping is performed by mapping a matrix description onto resource elements used for the reference signal.

22. The method according to claim 1, wherein reference sequence matrices from the plurality of reference sequence matrices are orthogonal to each other.

23. A transceiver for use in a cellular telecommunication system, said transceiver being arranged for generating a reference sequence matrix and mapping elements of the reference sequence matrix to a position of a reference signal used for channel estimation in the cellular telecommunication system, the transceiver configured to:

generate a matrix $S_N$ of dimension $N \times N$ having N orthogonal rows or columns, with N being a positive integer $>3$;

generate a plurality of reference sequence matrices $OS^{(k)}$, $k=0, \ldots, N-1$, from the matrix $S_N$; and map elements of at least one of the reference sequence matrices to a position of a reference signal having predetermined locations in a two-dimensional time-frequency symbol space, wherein rows or columns of a kth reference sequence matrix $OS^{(k)}$ are based at least in part on a (k+1)th row or column respectively, of the matrix $S_N$.

24. The cellular telecommunication system of claim 23, the system comprising at least one transceiver.

* * * * *